US005773060A

United States Patent [19]
Smith

[11] Patent Number: 5,773,060
[45] Date of Patent: Jun. 30, 1998

[54] METHOD OF CONTROLLING AND ADJUSTING THE AMOUNT OF FLUID INJECTED INTO A MEAT PRODUCT

[75] Inventor: David W. Smith, West Des Moines, Iowa

[73] Assignee: Townsend Engineering Company, Des Moines, Iowa

[21] Appl. No.: 656,147

[22] Filed: May 30, 1996

Related U.S. Application Data

[63] Continuation-in-part of Ser. No. 503,455, Jul. 17, 1995, abandoned.

[51] Int. Cl.[6] .................................................. A23L 1/31
[52] U.S. Cl. .......................... 426/281; 426/231; 426/442; 426/652; 99/487; 99/532; 99/533; 99/534; 99/535
[58] Field of Search ................................ 426/231, 281, 426/332, 442, 541, 650, 652, 641, 323; 99/487, 532–536, 516; 452/198

[56] References Cited

U.S. PATENT DOCUMENTS

| | | | |
|---|---|---|---|
| 3,636,857 | 1/1972 | Panek | 99/532 |
| 3,656,424 | 4/1972 | Evenson | 99/487 |
| 3,683,789 | 8/1972 | Beasley | 99/533 |
| 3,687,058 | 8/1972 | Townsend | 99/533 |
| 3,695,166 | 10/1972 | Hoffmann | 99/533 X |
| 3,863,556 | 2/1975 | Townsend | 99/533 X |
| 3,922,357 | 11/1975 | Townsend | 426/281 |
| 4,142,000 | 2/1979 | Townsend | 426/281 |
| 4,220,669 | 9/1980 | Townsend | 476/281 |
| 4,254,151 | 3/1981 | Townsend | 476/281 X |
| 4,286,510 | 9/1981 | Prosenbauer | 99/533 |
| 4,292,889 | 10/1981 | Townsend | 99/533 |
| 4,437,397 | 3/1984 | Kawai | 99/533 |
| 4,455,928 | 6/1984 | Townsend | 99/533 |
| 4,487,119 | 12/1984 | Townsend | 99/533 X |
| 4,690,046 | 9/1987 | Corominas | 99/535 X |
| 4,784,055 | 11/1988 | Langen et al. | 99/533 |
| 4,903,590 | 2/1990 | Miller et al. | 426/281 X |
| 4,924,771 | 5/1990 | Langen et al. | 99/535 X |
| 5,012,728 | 5/1991 | Langen et al. | 99/472 X |
| 5,272,964 | 12/1993 | Ostergaard | 99/527 |
| 5,275,095 | 1/1994 | Van Haren | 99/533 |
| 5,342,235 | 8/1994 | Watanabe | 99/532 |

FOREIGN PATENT DOCUMENTS

| | | | |
|---|---|---|---|
| 38947 | 8/1973 | Australia | 99/532 |
| 0 191 712 | 8/1986 | European Pat. Off. . | |
| 0 396 847 B1 | 3/1993 | European Pat. Off. . | |
| 2628941 | 9/1989 | France | 426/281 |
| 3420019 C2 | 5/1985 | Germany . | |
| 3509158 | 9/1986 | Germany | 426/281 |
| 3716802 C2 | 7/1988 | Germany . | |
| 7408100 | 10/1975 | Netherlands | 426/281 |

OTHER PUBLICATIONS

Belam Literature, Belam, B.V., –1990.
The Challenge, Schroder N61; N184; N40–1990.

*Primary Examiner*—Milton Cano
*Attorney, Agent, or Firm*—Zarley, McKee, Thomte, Voorhees, & Sease

[57] ABSTRACT

A method of injecting fluid into meat entails weighing the meat product, injecting it with fluid, weighing the injected meat product, determining the ratio between these weights, comparing that ratio with a target ratio, and adjusting the time that the needles penetrate the meat product so that the next meat product will have its weight ratio adjusted towards the target ratio if a variance with target ratio exists with respect to the first injected meat product.

3 Claims, 13 Drawing Sheets

Fig. 22 under pressure, into the needles. If the fluid pressure within the needle overcomes the down force of the poppet valve spring, the poppet valve will rise up off of the valve seat of the needle and expose the needle interior to the fluid under pressure. The spring loaded plunger within the poppet valve prevents the stem of the needle from being damaged when the needle is depressed.

5,773,060

1
METHOD OF CONTROLLING AND ADJUSTING THE AMOUNT OF FLUID INJECTED INTO A MEAT PRODUCT

CROSS-REFERENCE TO A RELATED APPLICATION

This application is a continuation-in-part of Ser. No. 08/503,455 filed Jul. 17, 1995 now abandoned.

BACKGROUND OF THE INVENTION

It is common to inject brine or similar fluids into meat products for purposes of preservation and flavoring. Many machines have been devised which have a battery of reciprocal needles which are adapted to penetrate meat products and are adapted to inject fluid into the meat products through the needles.

Existing machines have a tendency to waste the injected fluid and lack the ability to effectively and uniformly inject fluid into the meat product, particularly when variations in thickness of the meat product exists. These machines emit fluid from all needles even if some needles do not engage the meat product. In addition, existing machines have gang stripper plates that can damage the meat product, and most are often difficult to clean. Further, they have not taken full advantage of computer technology to enhance their operation and efficiency.

It is therefore a principal object of this invention to provide a method and machine for injecting fluids into food products which will not waste the fluid being injected, and which will not damage the meat.

A further object of this invention is to provide a method and means for injecting food products which will automatically and uniformly inject fluid into a piece of meat which varies in thickness.

A further object of this invention is to provide a method and machine for injecting fluid into meat products wherein each needle injects fluid independently of other needles, and wherein each needle has its own stripper element.

A further object of this invention is to provide a machine for injecting fluid into food products which is easily cleaned.

A further object of the invention is to provide a machine for injecting fluid into meat products wherein the amount of fluid injected is proportional to the volume of meat injected.

A further object of the invention is, in an alternative embodiment, to provide a machine for injecting fluid into meat products wherein the amount of fluid injected is controlled by a microprocessor which through a variable speed motor can slow down or speed up the time that the injection needles are in the meat product, thus controlling the amount of fluid that is injected into the meat product.

These and other objects will be apparent to those skilled in the art.

SUMMARY OF THE INVENTION

The machine of this invention includes a plastic head, manifold or block which has 330 vertical bores therein with each bore slidably receiving a stripper tube. Bushings in the upper and lower ends of each bore embrace the tubes. One or more fluid containers are mounted on the top of the head and contain fluid under pressure.

The stripper tubes have a length substantially twice that of the vertical thickness of the head. The tubes are about 14 inches in length. Commencing approximately ¾ of an inch from the upper end, and extending downwardly for a length

2 of about 5 inches, a slot appears in one face of the tube and comprises approximately ⅓ of the periphery of the tube.

A poppet valve is mounted in the upper end of the stripper tube and has a plastic cap thereon. A spring loaded plunger is mounted in the poppet valve and has a valve seat that extends downwardly. The poppet valve has a stem that extends upwardly through the cap. The spring yieldingly urges the valve head downwardly.

An elongated needle assembly is movably mounted within the stripper tube. The needle assembly is comprised of an elongated hollow needle having a length slightly greater than the stripper tube. The upper end of the needle assembly has a valve seat thereon which is adapted to receive the valve head of the poppet valve to seal the interior of the needle from the flow of fluid. Normally, pressurized fluid surrounds the poppet valve and the upper surface of the valve seat. A horizontal key plate on the head extends through the slot opening in the stripper tube and protrudes underneath the lower edge of the valve seat.

A spool extends around the needle at approximately the mid-point thereof and slidably engages the inner wall of the stripper tube. The spool serves to center the needle on the center axis of the stripper tube to stabilize its position therein. The spool also serves to seal the needle with respect to the tube.

The lower end of the stripper tube has a plastic stripper pad secured thereto. The stripper pad will always dwell below the lower surface of the block even when the stripper tube is in its uppermost position within the block. The pad limits the upper travel of the stripper tube into the block. The stripper pad has three oblong openings adjacent its lower end and has a small aperture in its lower end through which the exit end of the needle dwells when the head is in its uppermost position.

A set of separate needles is positioned below the needle assembly to create fluid voids in the lower portion of the meat product to receive fluid being injected from the upper side of the meat product from the needles of the needle assembly.

In an alternative embodiment, a microprocessor through a variable speed motor can slow down or speed up the time that the injection needles are in the meat product, thus controlling the amount of fluid that is injected into the meat product.

The method involves the sequential steps for sensing the thickness or weight of the meat, and appropriately injecting the correct amount of fluid therein including the use of a computer to control the various steps of the injection process. The computer takes the injected weight of the meat, compares it with a target weight (or weight increase), and automatically makes fluid injecting adjustments if weight variations exist.

DESCRIPTION OF THE PREFERRED EMBODIMENT

The term "meat product" as used herein is intended to be generic for any food product that might require injection, including, without limitation, meats, poultry and fish.

Figures 1, 2:
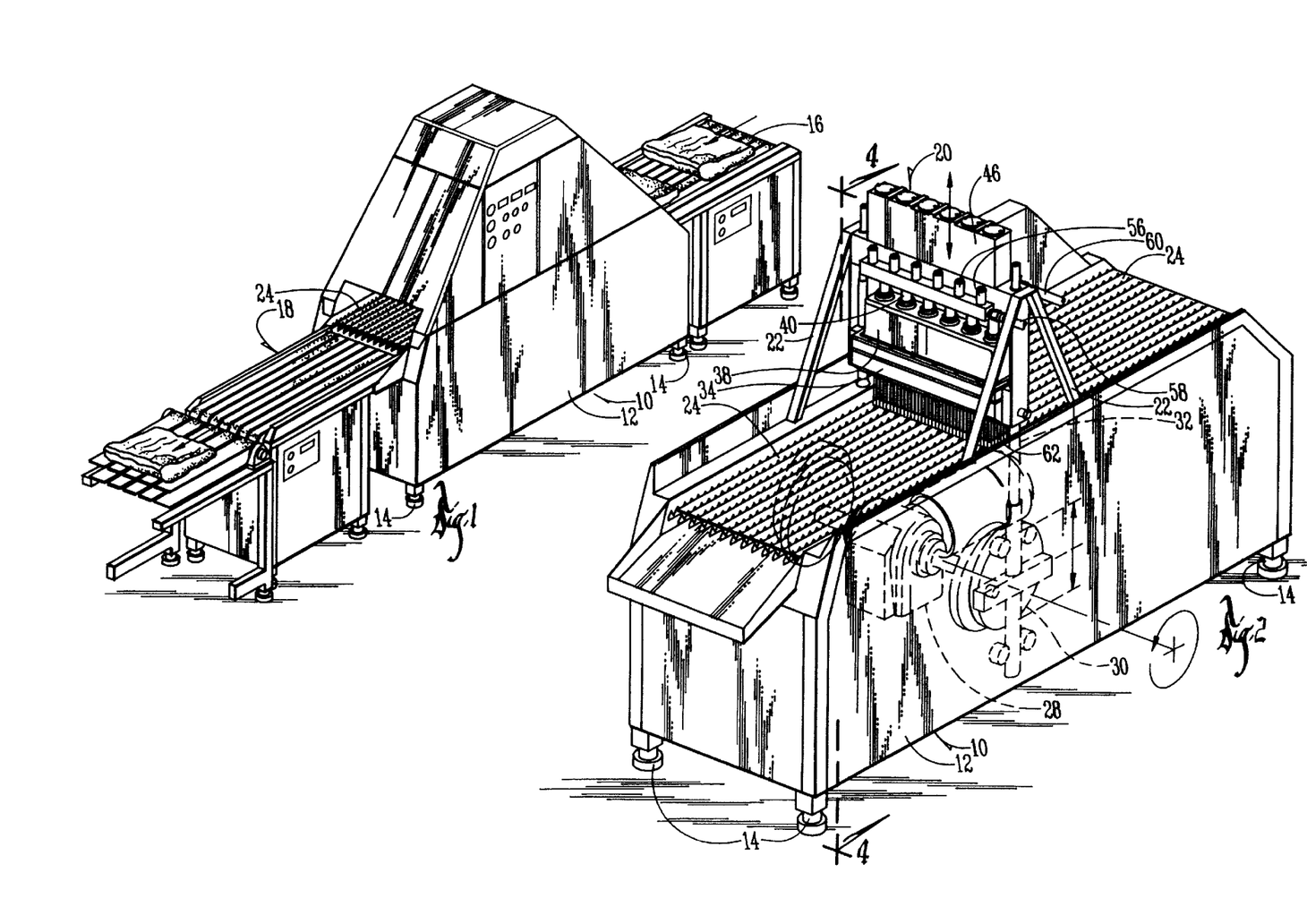
FIG. 1 is a perspective view of the injection machine of this invention.
FIG. 2 is an enlarged scale perspective view of the center portion of the machine in FIG. 1 with the cover removed therefrom.
Figure 3:
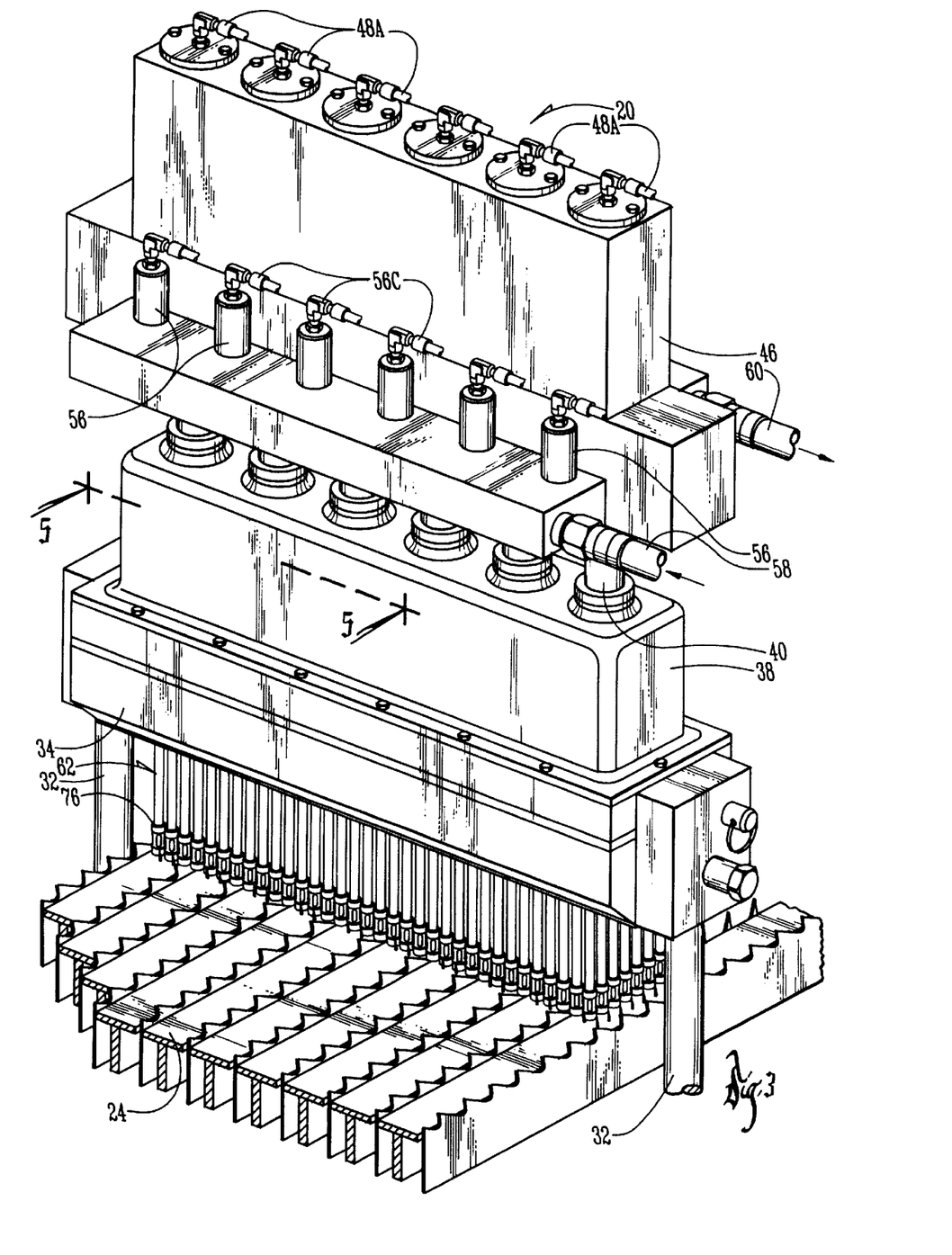
FIG. 3 is an enlarged scale perspective view of the needle head assembly.
Figure 4:
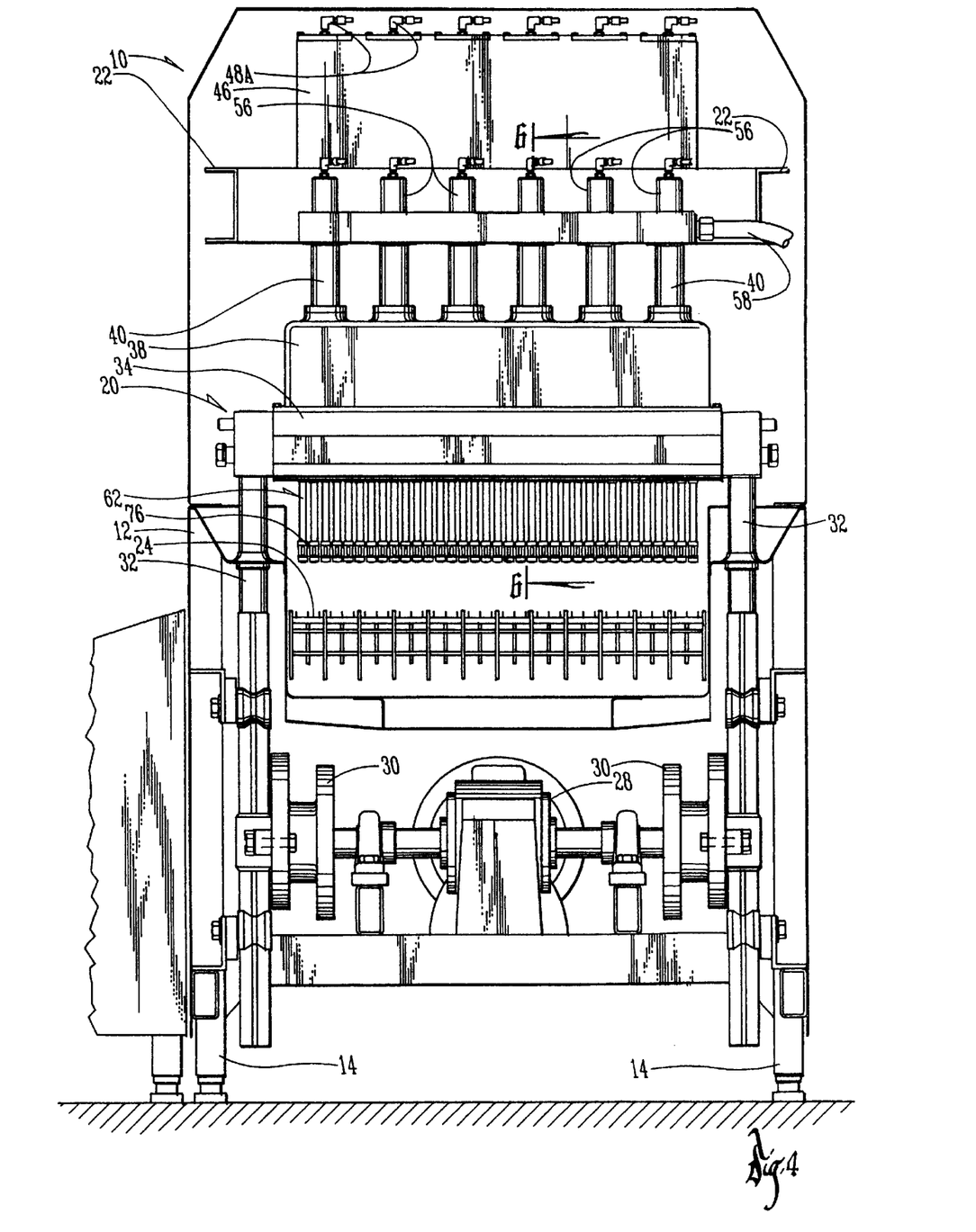
FIG. 4 is an enlarged scale sectional view of the machine taken on line 4—4 of FIG. 2.

With reference to FIG. 1, the injector in the injection machine 10 has a frame 12 with four conventional legs 14. An input scale and conveyor is located at the inlet at one end of the machine and an output scale and conveyor 18 is located at the other end of the machine. With reference to FIG. 2, a needle assembly 20 is mounted on the top of frame 12 and is held in place by brackets 22. A conventional horizontal walking beam transport 24 is mounted on the upper surface of the frame 12 and serves to transport meat products from one end of the machine to the other in conventional fashion. The horizontal walking beam transport 24 has the conventional functional ability to lift the meat product upwardly slightly from a supporting surface, move it forwardly in a longitudinal direction a given increment, and then lower it back to its original plane of support.

As shown by the dotted lines in FIG. 2, a power mechanism 28 provides operational power to the various components of the machine 10 including the horizontal walking beam transport 24 and the needle assembly 20. Cam assembly 30 is operationally connected to power mechanism 28 and lift arms 32 which are in turn a part of the needle assembly 20.

Figure 5:
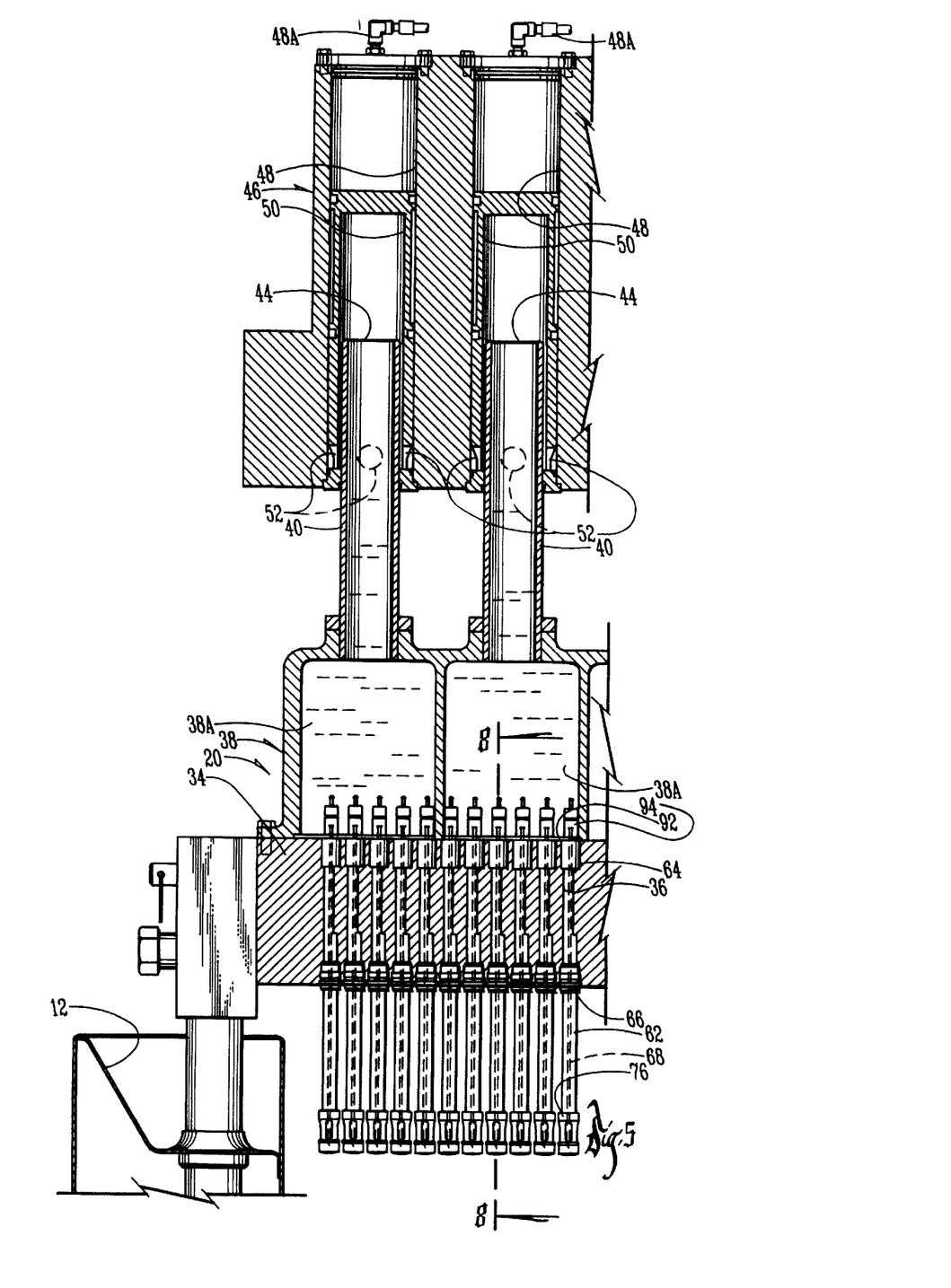
FIG. 5 is an enlarged scale sectional view taken on line 5—5 of FIG. 3.
Figure 6:
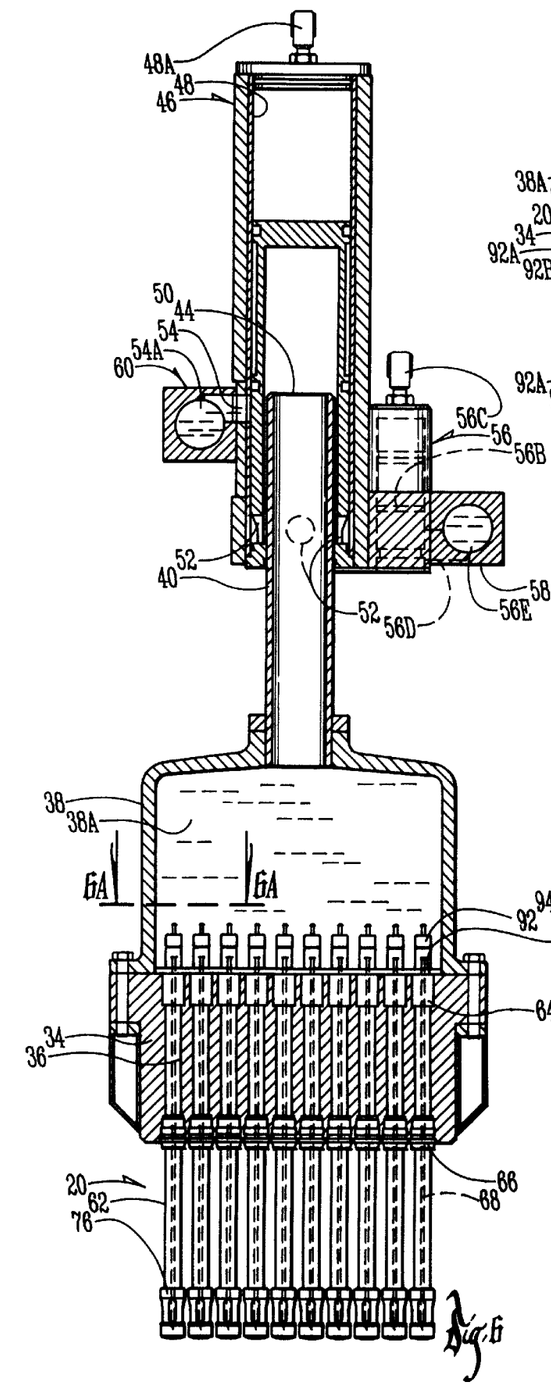
FIG. 6 is an enlarged scale sectional view taken on line 6—6 of FIG. 4.
Figures 17, 19:
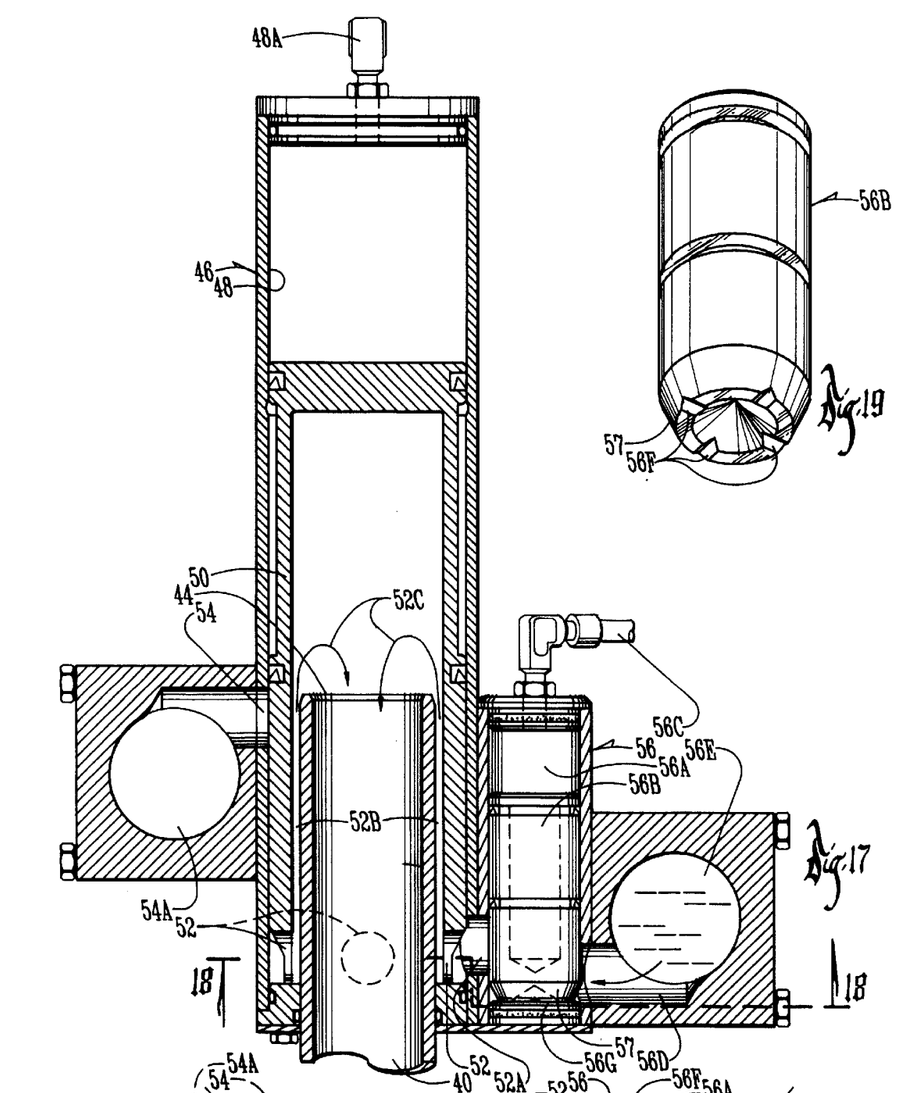
FIG. 17 is a large scale sectional view of the upper portion of FIG. 6.
FIG. 19 is an enlarged scale perspective view of the value of FIG. 17.
Figure 18:
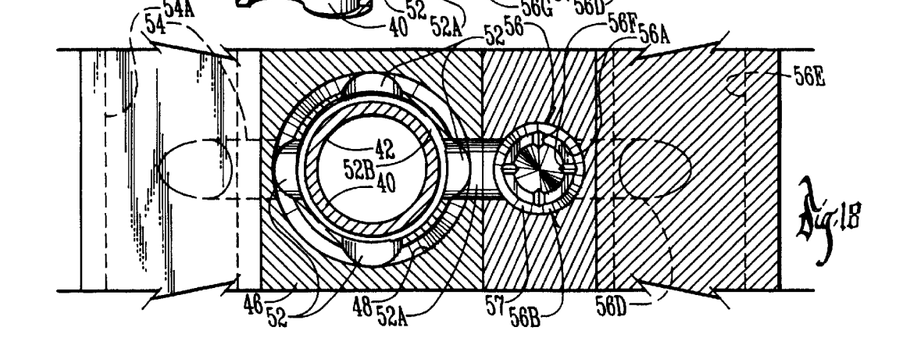
FIG. 18 is a sectional view taken on line 18—18 of FIG. 17.

With reference to FIGS. 5 and 6, a manifold block 34 has in the order of 330 vertical bores 36 and these bores are located in groups of 50 or so. A fluid reservoir 38 is bolted or otherwise secured to the upper portion of manifold block 34 and is divided into six fluid compartments 38A. A hollow rigid piston rod 40 extends upwardly from the top of each fluid reservoir or compartment 38A. The numeral 44 designates the upper end of rod 40 which is rigidly inserted within the dampener cylinder block 46, as will be described hereafter. Block 46 has a plurality of vertical bores 48 to slidably receive piston sleeves 50, which slidably receive the upper ends of rods 40. Each bore 48 has an air line 48A (FIG. 17). As shown in FIGS. 6 and 17, apertures 52 and 54 are located in sleeve 50 and block 46, respectively, and are vertically spaced with respect to each other.

Air pressure valves 56 are mounted on block 46 at the base of each bore 48 and communicate with the interior of sleeves 50 by aperture 52A (FIG. 17). It should be noted that any fluid in aperture 52A is always in communication with the space 52B around the outside of rod 40. The arrows 52C in FIG. 17 show the path of fluid flow between aperture 52 of valve 56, upwardly through space 52B and into the upper end of rods 40.

The pressure valve 56 has a bore 56A in which piston 56B is slidably mounted. The top of bore 56A is connected to pressurized air line 56C. As shown in FIGS. 17 and 19, the bottom of piston 56B is tapered inwardly at 57 to allow pressurized fluid from conduit 56D and fluid pressure line 58 to surround the taper 57 with fluid. This phenomenon is facilitated by the fluid notches 56F in the bottom of piston 56B which normally rests on the bottom 56G of bore 56A. As will be explained hereafter, whenever air or fluid conditions are such that piston 56B rises in bore 56A so that taper 57 registers with aperture 52A, pressurized fluid will flow from line 56E into aperture 52A and aperture 52, and thence into space 52B.

Aperture 52 and 54 communicate with each other when fluid pressure conditions are such that piston sleeve 50 rises from the position of FIG. 17 so that apertures 52 register with aperture 54. Aperture 54 communicates with bore 54A in fluid return line 60. (FIG. 17).

Figure 9:
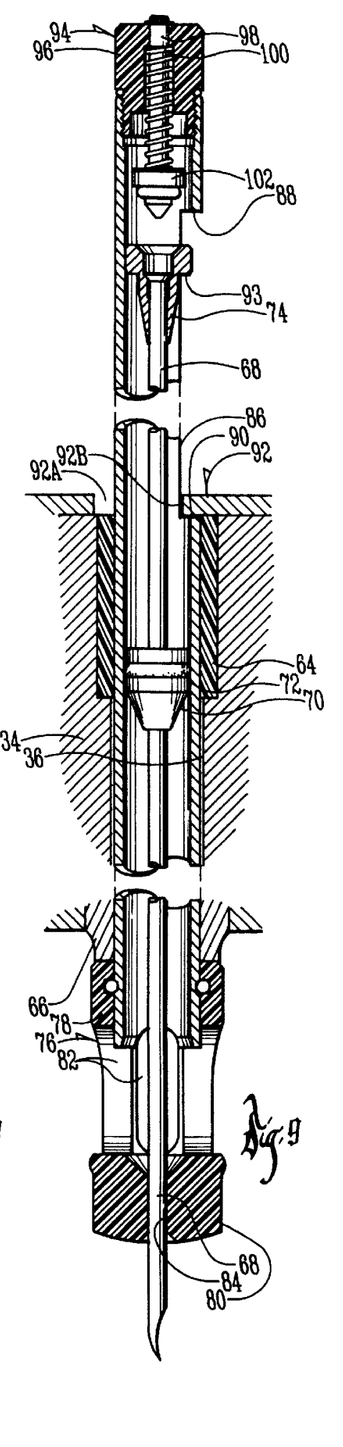
FIG. 9 is a sectional view similar to that of FIG. 8 but shown at an enlarged scale.

As shown in FIG. 9, stripper tube 62 is slidably inserted through a top bushing 64 and a bottom bushing 66 which are mounted within the bores 36 of manifold block 34. A hollow injection needle 68 is mounted within each of the stripper tubes 62. A spool 70 is located near the mid-point of needle 68. Spool 70 serves to center the needle within the stripper tube 62 and also, by means of seal 72, serves to seal the interior of stripper tube 62 above spool 70 from the interior of the stripper tube below spool 70. This prevents any fluid from moving downwardly past the spool 70 through the stripper tube 62. The spool 70 acts as a piston in response to the pressurized fluid bearing downwardly thereon to provide the penetration force for the needles. A valve seat 74 is mounted on the upper end of each needle 68 and when open, permits fluid to flow therethrough into the needle 68.

A stripper pad 76 is mounted on the lower end of stripper tube 62, and a locking ring or the like locks this interconnection between pad 76 and tube 62 (FIG. 9). Pad 76 has a top 78 and a bottom 80 with a plurality of elongated center slots 82. The slots 82 facilitate cleaning. A needle aperture 84 appears along the elongated axis of the bottom 80 of pad 76 to slidably receive the lower portion of needle 68.

Figure 7:
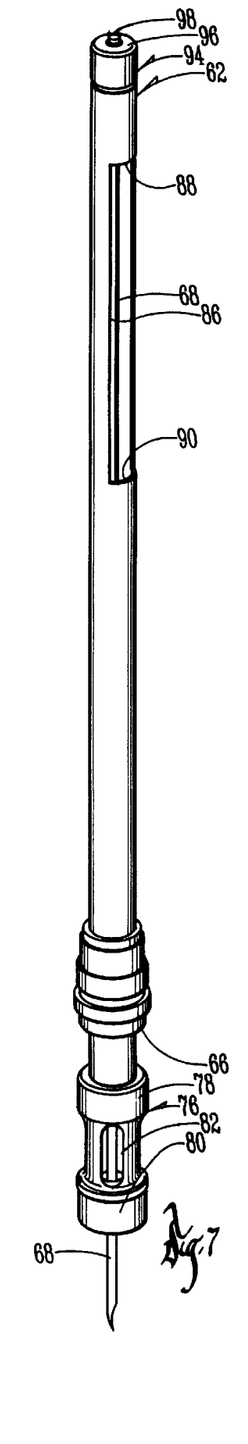
FIG. 7 is an enlarged scale perspective view of a needle and stripper tube of the invention.
Figure 15:
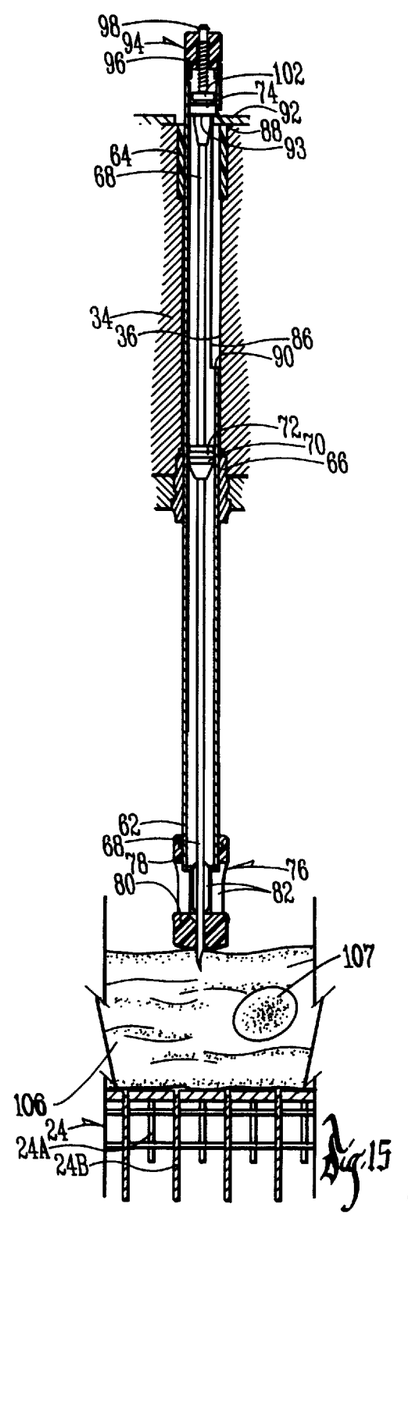

Stripper tube 62 has an elongated vertical slot 86 in one of its sides as best shown in FIGS. 7 and 9. The slot 86 has an upper end 88, and a lower end 90. A key plate 92 is secured to manifold block 32 and protrudes slightly across the upper end of bore 36 and stripper tube 62 (FIG. 15). As shown in FIGS. 9 and 15, key plate 92 engages the lower end of an annular shoulder 93 on valve seat 74 to prevent the valve seat 74 and needle 68 from protruding downwardly any further into the stripper tube 62.

Figure 6A:
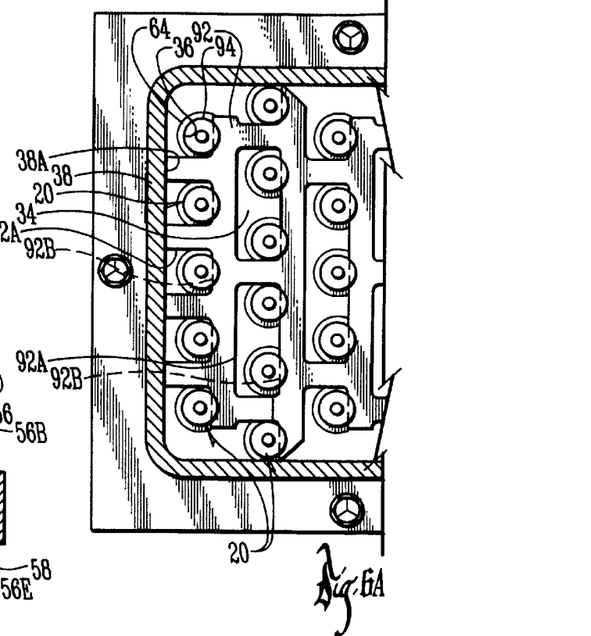
FIG. 6A is a sectional view taken on line 6A—6A of FIG. 6.
Figure 8:
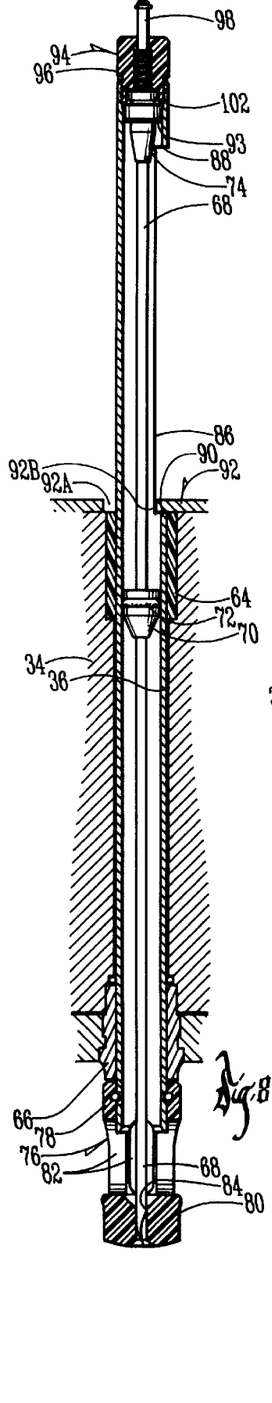
FIG. 8 is a sectional view of a needle and stripper tube assembly taken on line 8—8 of FIG. 5; but shows the needle under static (non-fluid pressure conditions) for illustrative purposes only.

Key plate 92 is mounted on top of block 34 (FIG. 6) and is held in place by reservoir 38. The plate 92 (FIG. 6A) has a plurality of apertures or openings 92A which are wide enough to receive the upper ends of stripper tubes 62. Upon assembly of the machine, plate 92 is placed over the upper ends of the tubes 62 and the poppet valves 94, and then is moved laterally a short increment so that the operating edges 92B thereof penetrate into the slots 86 in the tubes 62 as typically shown in FIGS. 8, 9 and 10.

A poppet valve 94 (FIG. 9) is mounted on the upper end of stripper tube 62 and is comprised of cap 96 which has a center shaft 98 slidably and vertically extending therethrough. Shaft 98 is embraced by coil spring 100 which extends between the cap 96 and the upper portion of valve head 102. Spring 100 normally urges the valve head 102 and shaft 98 to an extended position as shown in FIG. 9. As shown in FIG. 15, the upward movement of the stripper tube with respect to the manifold block 34 causes the valve seat 74 to engage the valve head 102 to prevent any further fluid from flowing into the needle 68.

It should be noted that the net fluid pressure bearing downwardly on stripper tube 62 causes the tube and pad 76 to move downwardly to engage the meat product.

The object of the foregoing structure is to provide fluid flow through each individual needle commencing an instant after the stripper pad has engaged the meat product and continuing while the needle moves downwardly through the meat product, and reverses its direction to a point in time of exit from the meat product. If a given needle never engages the meat product, it will not discharge any fluid at all.

Figures 9A, 10, 10A, 11:
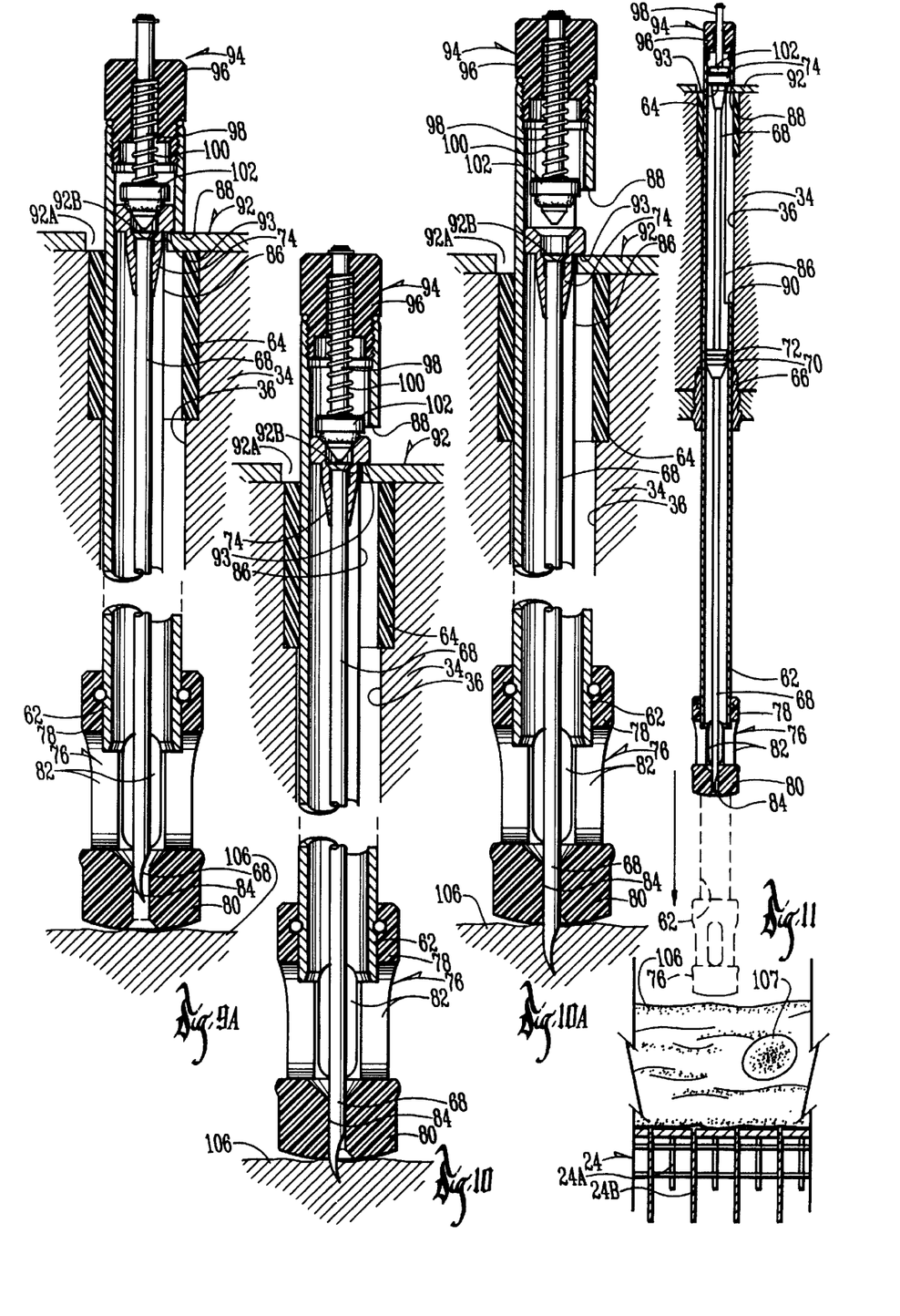
FIG. 9A is a sectional view similar to that of FIG. 11, and shows the stripper tube assembly just before engagement with the meat product.
FIG. 10 is a sectional view taken on line 10—10 of FIG. 12 and is similar to that of FIG. 9 but shows the needle in a position just after initial penetration into a meat slab.
FIG. 10A is a view similar to that of FIG. 10, but shows the needle a moment of time after the position of FIG. 10 when fluid flow through the needle commences.
FIGS. 11–15 are sectional views of the needle and stripper tube assembly showing the sequence of the injection phenomenon of each needle and stripper tube assembly.
Figure 12:
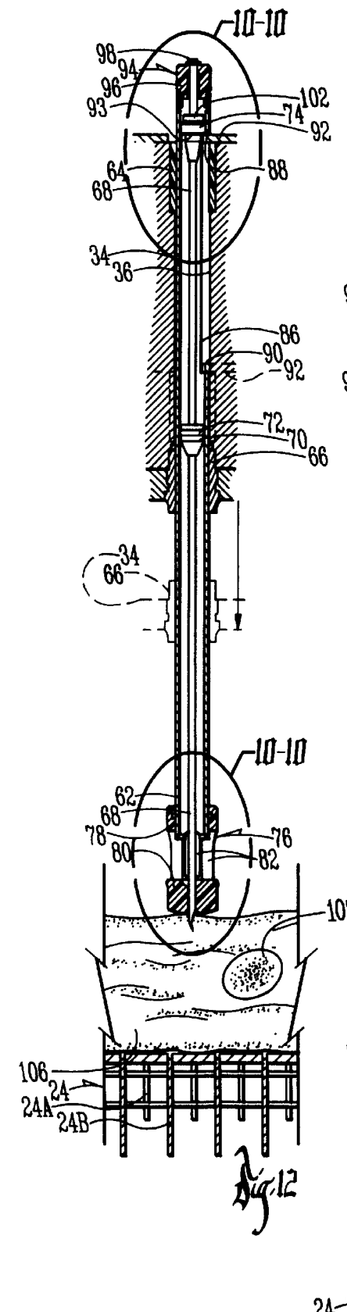
Figures 13, 14:
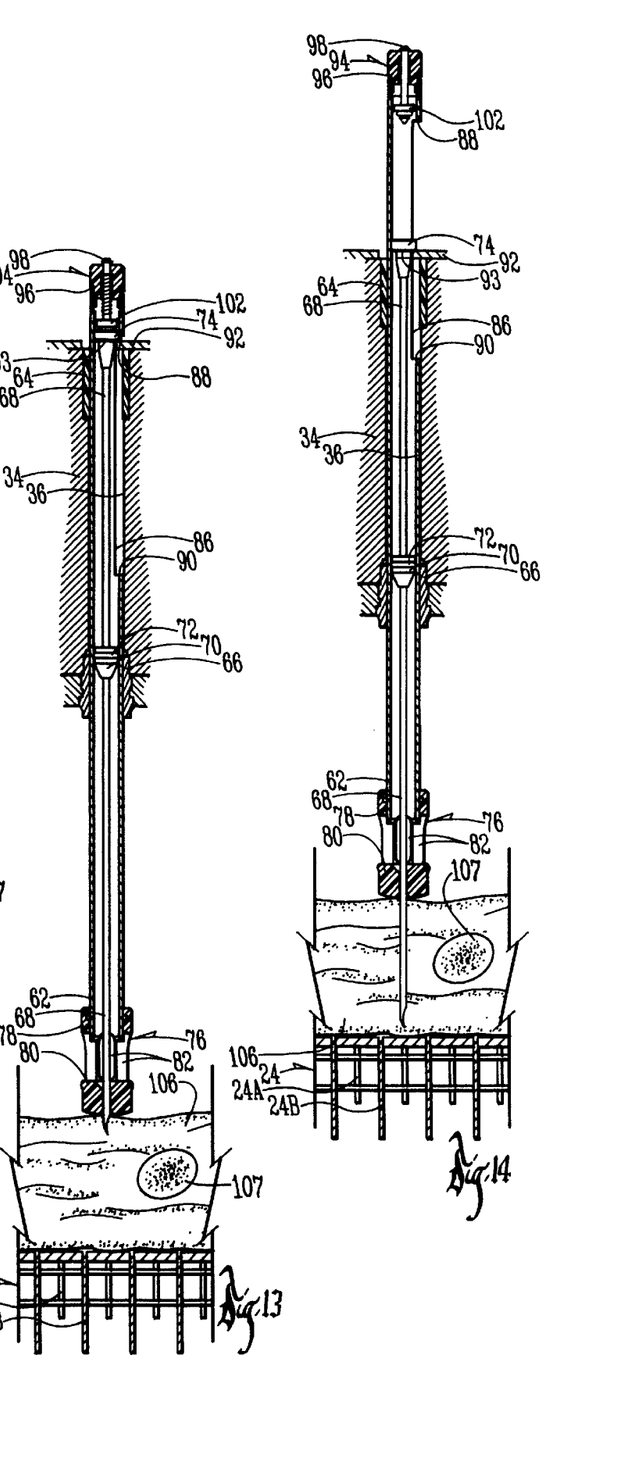

In operation, FIGS. 9A and 11 show the position of the stripper tube assembly before engagement with the meat product. No fluid is flowing through the needles at that point in time. FIGS. 10 and 12 show the needle after the needle has initially penetrated the meat product but before fluid flow commences. Figs. 10A and 13 show the needle in a position of initial penetration when fluid flow commences. FIG. 14 shows the needle in a position of maximum penetration into the meat product. FIG. 15 is a view similar to FIG. 13 showing the needle exiting the meat product and generally depicts the position when fluid flow cease.

In a normal injection cycle, the head is lowered a vertical distance of approximately 4.5 inches. Stripper tube 62 moves downwardly in unison with all of the rest of the stripper tubes as the block 34 moves downwardly. Stripper tube 62, through the stripper pad 76 on the lower end thereof, is the first to engage the thickest part of the meat product. This causes the downward movement of the stripper tube 62 to cease as the block 34 continues downward to its lowermost position. In such case, the block 34 "slides" downwardly on each of the stripper tubes that have contacted the meat product, and the upper end of the tubes project upwardly from the block 34 a distance corresponding to the meat thickness. See FIG. 14. While the stripper tube 62 no longer moves downwardly, the fluid pressure on the upper end of the valve seat 74 at the top of the needle, and on the spool 70, as described above, keeps the valve seat in contact with the key plate 92 and causes the downward movement of the needle to continue to penetrate the meat. Continued movement of the needle relative to the "stopped" stripper tube causes the valve seat 74 to separate from the spring loaded poppet valve 94 (and valve head 102) which allows fluid under pressure to flow downwardly through the needle and outwardly through the lower end of the needle. The flow of fluid through the needle is slightly delayed because the poppet valve 94 follows the downward movement of the needle assembly a short increment due to the action of spring 100 before the separation of the valve seat 74 and the valve head 102 of the poppet valve 94. Thus the needle progressively moves downwardly into the meat and fluid flow continues throughout the movement of the needle downwardly and upwardly until the valve seat 74 rejoins the valve head 102 of poppet valve 94 corresponding to a location which is a small increment of distance before the top of the needle leaves the top surface of the meat. Since fluid flow through the needles commences an instant after entry into the meat product (Fig. 10A), and ceases an instant before leaving the meat product (FIG. 15), fluid is not wasted by flowing from the needles outside the meat product.

The head then starts its upward vertical movement and the key plate 92 starts to pull the needle upwardly out of the meat. The stripper tube remains stationary as the head slides "upwardly" on the stripper tube. Fluid flows outwardly from the lower end of the needle as long as it is within the meat product. As the needle is about to depart from the product, the valve seat has been moved upwardly to a level that it re-engages the valve element of the poppet valve whereupon fluid flow through the needle is stopped just before the needle departs or exits from the meat product.

Figures 20, 21:
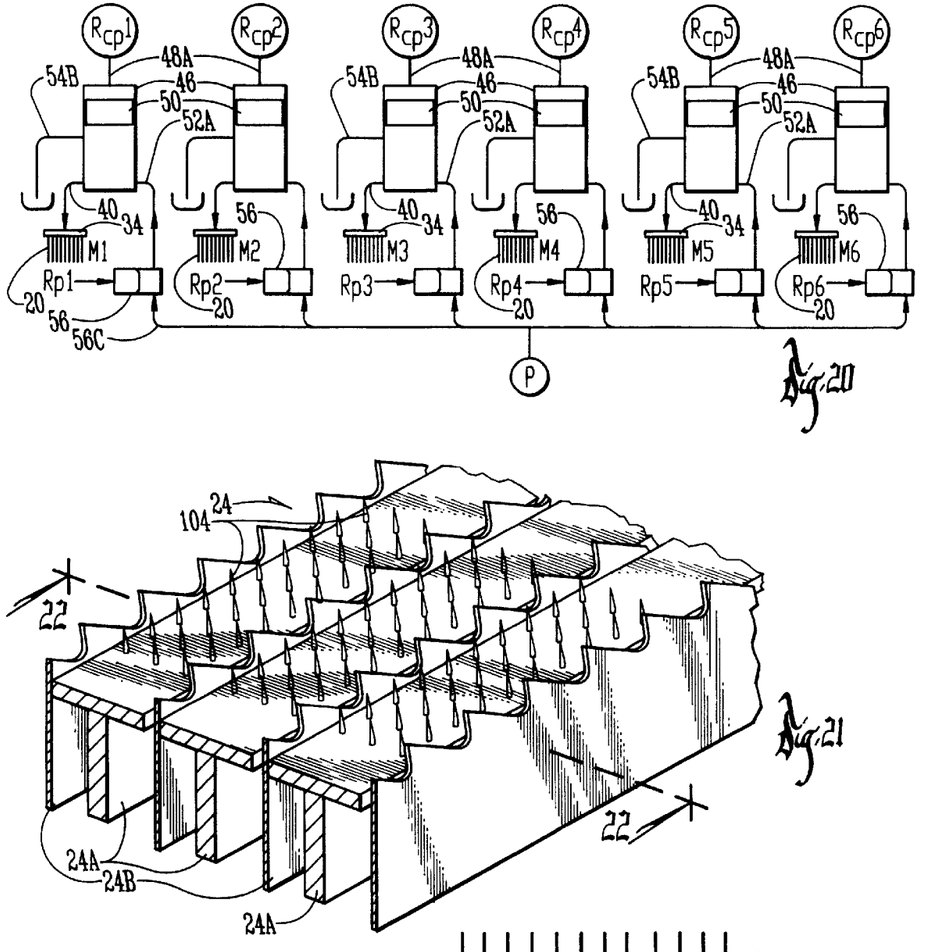
FIG. 20 is a schematic view of the fluid control system for the various groups of injection needles.
FIG. 21 is a partial perspective view of the walking beam.
Figure 22:
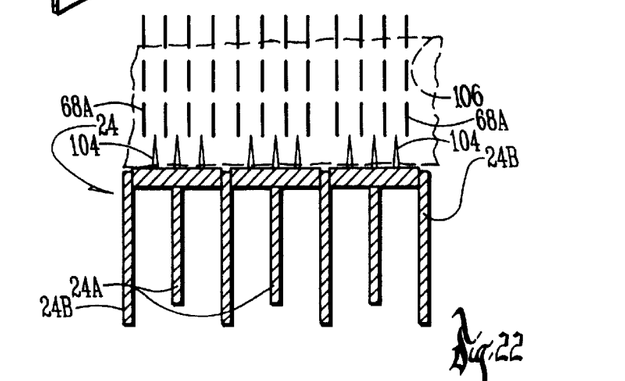
FIG. 22 is an enlarged scale sectional view taken on line 22—22 of FIG. 21.

The action of each needle and stripper tube is independent from other needles and stripper tubes. For example, a stripper tube that engages a thinner portion of the meat product goes through the same essential process as the needle described heretofore except that the injection time of the fluid is reduced directly in proportion to the relative thickness of the meat where injected by each individual needle. A plurality of either dormant or active needles 104 (FIGS. 21, 22) are located on the frame 12 underneath the normal location of the meat product. (The lower needles 104 are shown only in FIGS. 21 and 22, but can be used in the devices of FIGS. 11–15, for example.) The lower needles 104 are mounted on the upper surfaces of support T-bars 24A of walking beam transport 24. The needles 104 are laterally aligned and spaced on 7/16 inch centers. They are also staggered with respect to the vertical axes of upper needles 68 so that the needles 104 penetrate the meat product at locations spaced from the axis of penetration of the upper needles 68. The vertical axes of various of the needles 68 are designated by the numerals 68A in FIG. 22. The voids in the meat product 106 created by lower needles 104 are normally filled by fluid migrating from needles 68. When the meat is being injected, the conveyor bars 24B of walking beam conveyor are in a conventional non-transport position wherein they do not extend above the upper surfaces of T-bars 24A. The lower needles 104 are approximately ⅜ ths of an inch in height and penetrate the meat product along vertical axes slightly removed from the axes of the injection needles 68. The lower needles 104 are offset from the injection needles and create cavities in the meat, and the fluid injector by the upward needles migrates towards the cavities generated by the lower needles. The lower needles can also be made operative for fluid injection purposes.

Figure 16:
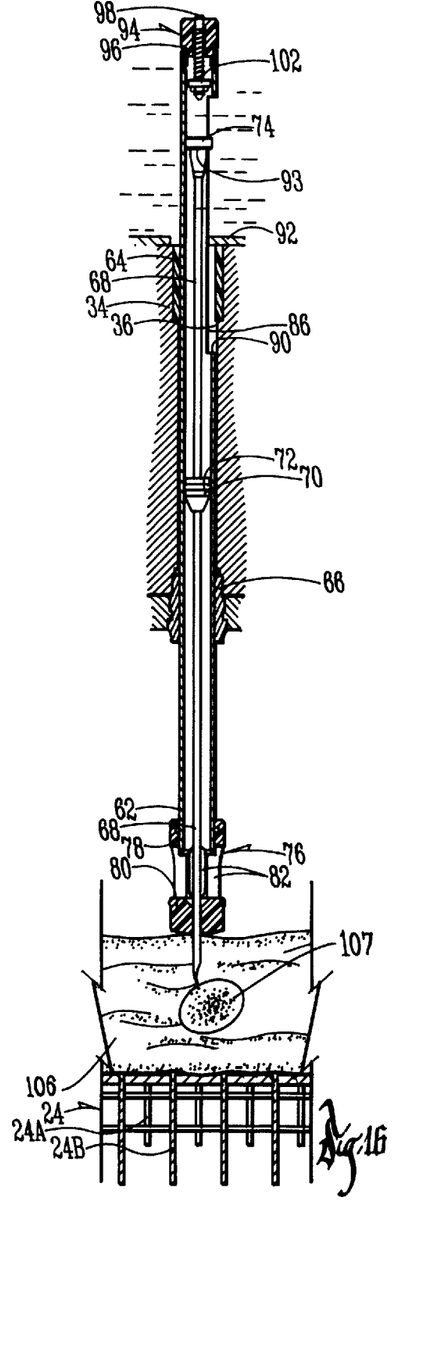
FIG. 16 is a sectional view similar to that of FIG. 14 but shows the position of the needle when encountering a bone within the meat product.

FIG. 16 shows the lower end of a needle 68 engaging a bone 107 in meat product 106. The needle is protected against damage because it is permitted to slide upwardly within stripping tube 62.

The needle head assembly 20 is separated into a number of individually controlled pressurized fluid zones such that the needle assemblies of one zone engaging a portion of meat of a certain consistency can be selectively varied with respect to the fluid pressure that would be proper for another portion of the meat being treated by another zone. The separate fluid pressure zones would be dispersed laterally across the head so that a distribution of desired injection pressures corresponding to the varying density of the meat would be provided to maintain a uniform percentage of fluid injection.

More specifically, the fluid reservoir 38 has a plurality of zones or fluid compartments 38A into which the hollow piston rods 40 extend, as previously described. The upper end of the cylinder block 46 is in communication with a source of compressed air through air line and air regulator 48A. A suitable air regulator is the MAC Proportional Pressure Controller, Model PPC5A made by MAC Valves, Inc., of Wixom, Mich. The air regulator 48A would be set at a pressure equal to and would determine the pressure in the pressurized container 38A that it controlled. Thus, if the fluid pump (not shown) produced 100 p.s.i., and if it was desired to have a fluid pressure of 30 p.s.i. in the first zone, the air regulator 48A at the top of cylinder 46 would be moved to a 30 p.s.i. position, whereupon the fluid regulator in the line between the fluid pump and the piston rod 40 would be regulated to adjust the fluid pressure to 70 p.s.i. This would be accomplished by adjusting the fluid regulator 56C of air pressure valve 56. The sum of the pressures between the fluid pressure regulator 56C and the air pressure regulator 48A will always equal the main discharge pressure of the supply pump (e.g., 100 p.s.i.).

The pressure in the other fluid zones 38A would be adjusted in the same manner. The system is controlled by a microprocessor (not shown) which weighed the meat product before and after the injection process. If it is desired to increase the weight of the meat product by 23% through the injection of fluid, and if the microprocessor detects that an injected meat product is slightly over or under the predetermined weight, (i.e., target weight), appropriate impulses are fed from the microprocessor to the air and fluid regulators (48A and 56C, respectively) described above to make an adjustment in the pressure in the fluid containers 38A to accommodate the required adjustment. If the second meat product processed is still out of the injection parameters, the microprocessor makes a further adjustment in the positive or negative direction of the pressure regulators to further refine the amount of injection of fluid.

DESCRIPTION OF THE ALTERNATE EMBODIMENT

FIGS. 23–27 depict an alternate form of the invention. In this embodiment, the pressure on the fluid remains constant, with the fluid flow being varied by a microprocessor-controlled variable speed motor which controls the rotational speed of reciprocal arms which control the penetration time of the injection needles. The injection needles and related structure of this embodiment are identical to those described heretofore. However, the fluid pressure controls (e.g., see FIGS. 17–20) are not used in this alternative embodiment.

Figure 23:
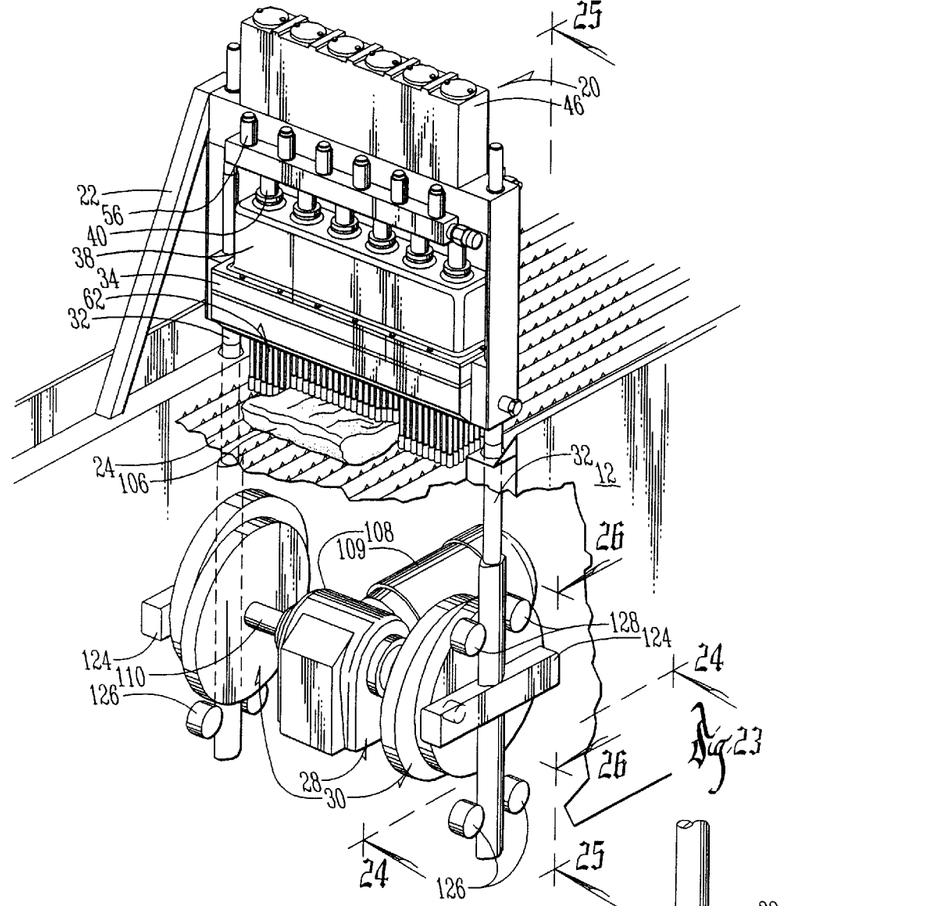
FIG. 23 is a partial perspective view of an alternate form of the invention.
Figure 24:
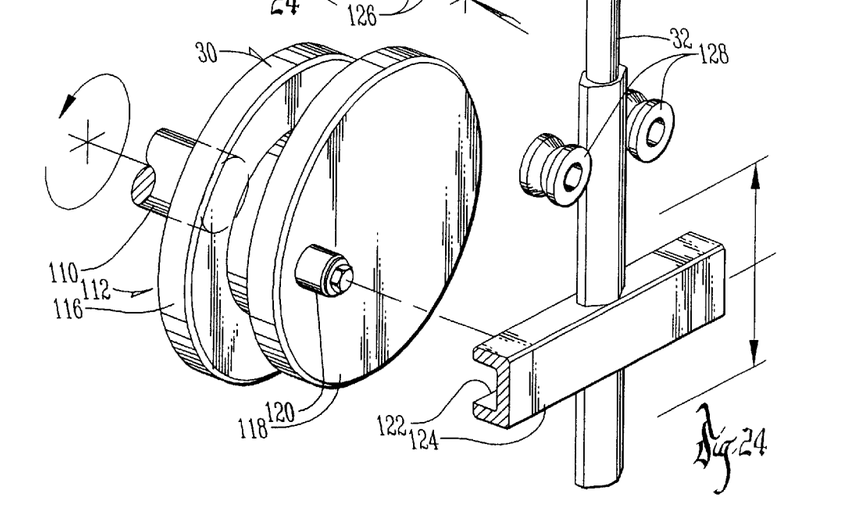
FIG. 24 is an enlarged scale exploded view taken on line 24—24 of claim 23.
Figures 25, 26, 27:
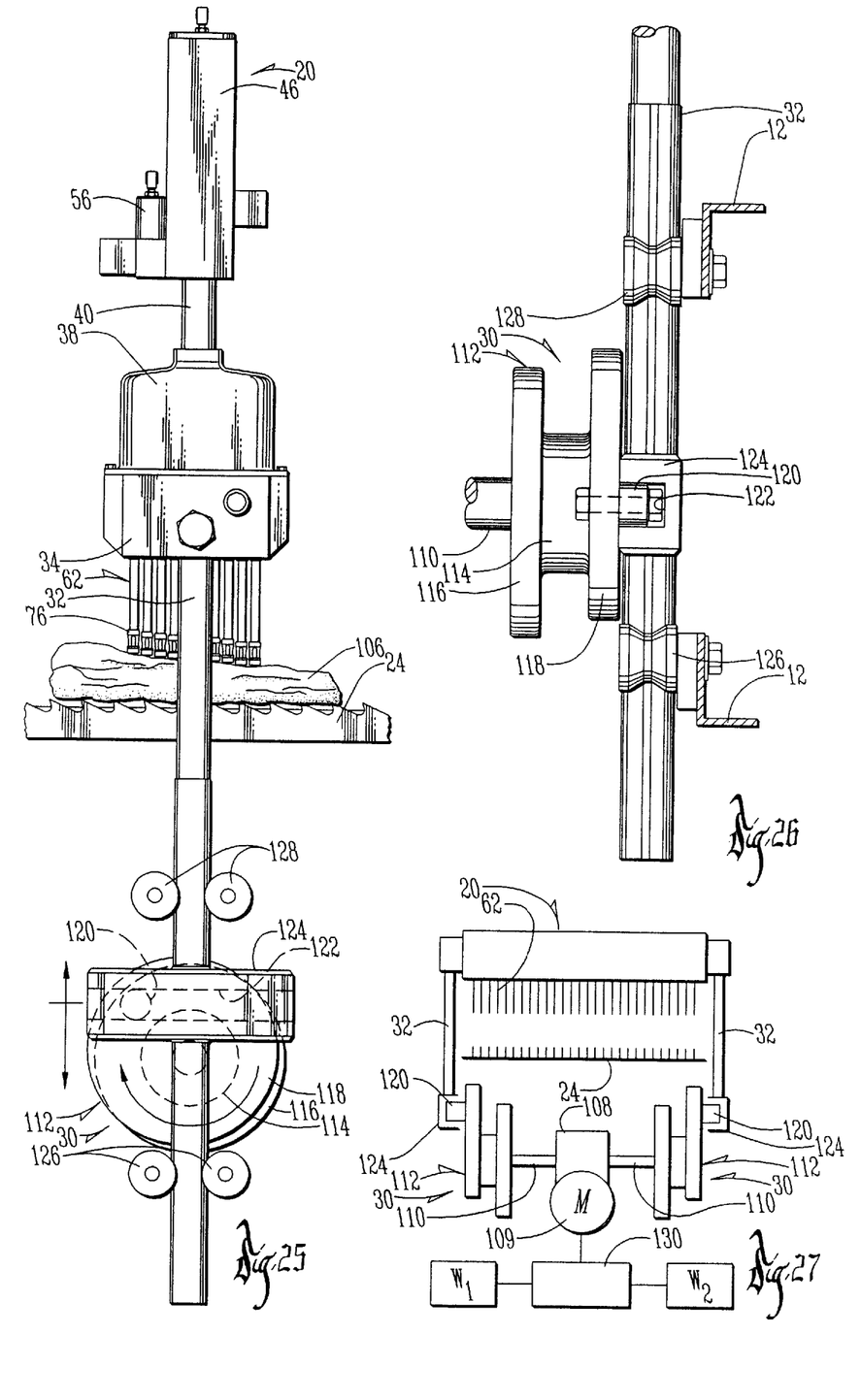
FIG. 25 is a large scale elevational view.
FIG. 26 is a partial large scale elevational sectional view taken on line 25—25 of FIG. 23.
FIG. 27 is a schematic view of the control system for the device of FIGS. 23–26

The manifold block 34 and fluid reservoir 38 have stripper tubes 62 depending therefrom (FIGS. 23, 25). Power mechanism 28 includes motor 109 and gear box 108, with ends of power shaft 110 extending outwardly from each side of gear box 108. Cam assembly 112 (FIGS. 24, 26), which is similar to cam assembly 30 (FIG. 2), has a center hub 114 concentrically mounted on shaft 110. Cam wheels 116 and 118 are integral with hub 114, are parallel to each other, and are eccentrically positioned on hub 114 and with respect to each other. Cam wheel 116 is operatively connected to conventional walking beam 24 by suitable linkage (not shown). A cam roller 120 is rotatably mounted on cam wheel 118 and is rotatably journaled in horizontal groove 122 of horizontal bar 124 (FIGS. 24, 26). Bar 124 is rigidly secured to the lower end of lift arm 32 which is slidably journaled for vertical movement in pairs of rollers 126 and 128 which are secured in any convenient manner to frame 12.

As hub 114 is rotated by motor 109, gear box 108 and shaft 110, the lift arm 32 is moved vertically in an upward and thence downward direction by cam roller 120 as the roller moves horizontally in groove 122 of bar 124, and as the roller also moves vertically as eccentrically positioned cam wheel 118 rotates with hub 114. The "12 o'clock" and "6 o'clock" positions of cam roller 120 define the upper and lower limits, respectively, of vertical movement of lift arm 32.

The foregoing cam assembly 112 is duplicated on opposite ends of shaft 100.

Motor 109 is operationally connected to microprocessor 130 (FIG. 27). Motor 109 is a variable speed motor which can have its rotational speed adjusted during the course of a single rotation. A motor suitable for this purpose is a 3 phase helical bevel A.C. gear motor which is controlled by a frequency inverter which is in turn controlled by a programmable logic controller coupled to a touch screen. Microprocessor 130 contains memory which contains the desired target weight ratio (weight before injection/weight after injection) for the meat product to be injected. It is operationally connected to scales $W_1$ and $W_2$ (FIG. 27) which weigh meat products before and after injection. The microprocessor 130 compares the weight of the injected meat product with the weight before injection, and compares the resulting ratio of weights with the target ratio. The microprocessor 130 then slows up or increases the rotational speed of motor 114 during each rotational cycle, to adjust the time that the needles are penetrating the meat product. Thus, the top of the rotational arc of shaft 110 and cam wheel 118 may move faster or slower than in the lower area of its rotational cycle. This invention compares the percent increase in weight of the meat after injection to what it was prior to injection and adjusts the quantity of fluid to be delivered accordingly. Thus, for a target percentage injection of 10%, a one pound piece of meat will increase 0.1 pound and a two pound piece of meat will increase 0.2 pounds. The ratio of the weight of the piece after injection to the weight of the piece prior to injection is the important comparison. The computer then compares weight out/weight in ratios with the target ratio.

More specifically, the precise control of the amount of fluid injected is accomplished by controlling the amount of time the injection needles are in the meat. This is done without affecting the production cycle rate of the machine. As indicated above, this is achieved through the use of the microprocessor 130 to vary the speed of the motor driving the crank shaft. The software of the microprocessor 130 is such that the time the cam wheel 118 is in its bottom 180 degrees of arc (the arc during which the needles have the potential of injecting into the meat) may be increased or decreased. This increase or decrease of rotational speed in the bottom 180 degrees of arc is automatically compensated for by a corresponding decrease or increase in rotational speed during the top 180 degrees. The automatic balancing of the change in the bottom 180 degrees with a corresponding change during the top 180 degrees results in a constant production cycle rate of the machine. The response time of the system is such that this system has successfully operated at speeds of 80 cycles per minute.

Another important feature in this embodiment is the control of the motion of the block 34 with the same computer drive system (130, etc.) such that the rotational speed of the shaft 110 is varied to produce a practically constant velocity motion thereby resulting in a system where the amount of time the injecting needles are available to a thin piece of meat is proportionately correct relative to the amount of time the injector needles are available to a thick piece of meat. This is achieved by controlling the rotational velocity of shaft 110 such that downward vertical velocity is practically constant until 35 degrees before bottom dead center at which time the rotation velocity begins to increase to a setable percent of net cycle speed. At 35 degrees after bottom dead center is reached, the computer 130 causes the motor 106 to begin to decrease the rotational velocity of the shaft 110. By means of this controlling system the vertical velocity of the needles 68 throughout the injection travel is approximately constant resulting in the amount of time the outlet ends of the needles are available to a thickness of meat that is constant. This results in an equal vertical distribution of injected fluid throughout the meat because the quantity fluid injected is proportional to time.

From the foregoing, it is seen that the device and method of this invention will accomplish at least its stated objective.

What is claimed is:

1. A method of injecting fluid into a meat product, comprising the steps of:

providing a plurality of fluid injection needles;

connecting a fluid reservoir containing pressurized fluid to said injection needles;

weighing a meat product;

reciprocally cycling said injection needles into and out of said meat product to penetrate said injection needles into said meat and to then inject said meat product with fluid from said injection needles, said cycling comprising controlling the vertical distribution of said fluid throughout said meat by adjusting the time said needles are injected into said meat product, to deliver a quantity of said fluid;

weighing said meat product after it is injected with said fluid;

comparing the ratio of the weight before and after injection with a target to determine any variance between said ratios; and increasing or decreasing the quantity of fluid to be delivered through the injection needles so that any variance in said ratios with respect to said target ratio will be minimized to permit a second meat product to be injected with fluid and to achieve said target ratio by increasing or decreasing the time that said needles are penetrating said meat product with respect to the time that said needles are withdrawn from said meat product.

2. The method of claim 1 wherein a computer calculates the needed change in said fluid to be delivered, and effects an increase or decrease in said fluid to be delivered to achieve said target ratio.

3. The method of claim 1 comprising the further step of individually controlling the amount of fluid injected into said meat product by each needle.

* * * * *

UNITED STATES PATENT AND TRADEMARK OFFICE
CERTIFICATE OF CORRECTION

PATENT NO. : 5,773,060
DATED : June 30, 1998
INVENTOR(S) : David W. Smith

It is certified that error appears in the above-identified patent and that said Letters Patent is hereby corrected as shown below:

Claim 1,
Line 9, replace first occurrence of "meat" with -- meat product --.

Signed and Sealed this

Twentieth Day of November, 2001

Attest:

*Attesting Officer*

NICHOLAS P. GODICI
*Acting Director of the United States Patent and Trademark Office*